United States Patent
Kupratis (10) Patent No.: US 8,935,923 B2
(45) Date of Patent: Jan. 20, 2015

(54) GAS TURBINE ENGINE WITH INTERCOOLING TURBINE SECTION AND INTERCOOLING TURBINE SECTION BYPASS

(75) Inventor: Daniel B. Kupratis, Wallingford, CT (US)

(73) Assignee: United Technologies Corporation, Hartford, CT (US)

( * ) Notice: Subject to any disclaimer, the term of this patent is extended or adjusted under 35 U.S.C. 154(b) by 528 days.

(21) Appl. No.: 13/325,034

(22) Filed: Dec. 13, 2011

(65) Prior Publication Data

US 2013/0098055 A1 Apr. 25, 2013

Related U.S. Application Data

(60) Provisional application No. 61/551,107, filed on Oct. 25, 2011.

(51) Int. Cl.
*F02C 1/00* (2006.01)
*F02K 3/02* (2006.01)
*F02C 6/00* (2006.01)
*F02C 7/143* (2006.01)

(52) U.S. Cl.
CPC .............. *F02C 7/143* (2013.01); *Y02T 50/675* (2013.01)
USPC ................................ 60/728; 60/226.1; 60/774

(58) Field of Classification Search
USPC ...................... 60/792, 774, 728, 226.1, 226.3
See application file for complete search history.

(56) References Cited

U.S. PATENT DOCUMENTS

| | | | | |
|---|---|---|---|---|
| 5,125,597 | A | * | 6/1992 | Coffinberry ............... 244/118.5 |
| 5,141,182 | A | * | 8/1992 | Coffinberry .................. 244/209 |
| 5,832,714 | A | | 11/1998 | Hines |
| 6,050,080 | A | | 4/2000 | Horner |
| 6,375,421 | B1 | * | 4/2002 | Lammas et al. ........... 415/199.5 |
| 6,935,119 | B2 | | 8/2005 | Placko et al. |
| 6,935,831 | B2 | | 8/2005 | Joshi |
| 7,685,827 | B2 | | 3/2010 | Reale et al. |
| 7,690,202 | B2 | | 4/2010 | Badeer et al. |
| 7,810,332 | B2 | * | 10/2010 | Olmes et al. ..................... 60/728 |
| 8,341,964 | B2 | * | 1/2013 | Finkenrath et al. ............. 60/772 |
| 2005/0138914 | A1 | * | 6/2005 | Paul ............................. 60/226.1 |
| 2008/0098713 | A1 | * | 5/2008 | Orlando et al. .............. 60/226.1 |
| 2009/0145102 | A1 | | 6/2009 | Roberge et al. |
| 2011/0056208 | A1 | | 3/2011 | Norris et al. |

OTHER PUBLICATIONS

NEWAC Technoloogies, Highly Innovative Technologies for Future Aero Engines, Mar. 2011.

* cited by examiner

*Primary Examiner* — Gerald L Sung
(74) *Attorney, Agent, or Firm* — Carlson, Gaskey & Olds, P.C.

(57) ABSTRACT

A gas turbine engine includes an intercooling turbine section to at least partially drive one of a low spool and a high spool. An intercooling turbine section bypass to selectively bypass at least a portion of a core flow through an intercooling turbine section bypass path around the intercooling turbine section.

26 Claims, 11 Drawing Sheets

GAS TURBINE ENGINE WITH INTERCOOLING TURBINE SECTION AND INTERCOOLING TURBINE SECTION BYPASS

REFERENCE TO RELATED APPLICATIONS

The present disclosure claims priority to U.S. Provisional Patent Application No. 61/551,107, filed Oct. 25, 2011.

BACKGROUND

The present disclosure relates to gas turbine engines, and more particularly to a variable cycle gas turbine engine.

Variable cycle engines power high performance aircraft over a range of operating conditions yet achieve countervailing objectives such as high specific thrust and low fuel consumption. The variable cycle engine essentially alters a bypass ratio during flight to match requirements. This facilitates efficient performance over a broad range of altitudes and flight conditions to generate high thrust when needed for high energy maneuvers yet also optimize fuel efficiency for cruise and loiter conditions.

SUMMARY

A gas turbine engine according to an exemplary aspect of the present disclosure includes a combustor section, a low spool along an engine axis with a fan section, a high spool along said engine axis with a high pressure compressor section and a high pressure turbine section, the high pressure compressor section forward of the combustor section to receive a core flow along a core flow path, an intercooling turbine section forward of the combustor section, and an intercooling turbine section bypass to selectively bypass at least a portion of the core flow through an intercooling turbine section bypass path around the intercooling turbine section.

In a further non-limiting embodiment of any of the foregoing gas turbine engine embodiments, the intercooling turbine section may be driven by said low spool.

In a further non-limiting embodiment of any of the foregoing gas turbine engine embodiments, the intercooling turbine section may be driven by the high spool.

In a further non-limiting embodiment of any of the foregoing gas turbine engine embodiments the intercooling turbine section may include upstream ICT variable vanes, downstream ICT variable vanes and an ICT rotor axially therebetween.

In a further non-limiting embodiment of any of the foregoing gas turbine engine embodiments, the upstream intercooling turbine vanes may include an inlet in communication with the core path.

In a further non-limiting embodiment of any of the foregoing gas turbine engine embodiments, the downstream intercooling turbine variable vanes may include an exit in communication with the core path.

In a further non-limiting embodiment of any of the foregoing gas turbine engine embodiments, the upstream intercooling turbine vanes may be downstream of a split between the core flow path and the intercooling turbine section bypass.

In a further non-limiting embodiment of any of the foregoing gas turbine engine embodiments, the gas turbine engine may further comprise a low pressure turbine (LPT) comprising LPT blades and a high pressure turbine (HPT) comprising HPT blades, wherein the shape of at least one of the upstream ICT blades and the downstream ICT blades are similar to the shape of at least one of the LPT blades and the HPT blades.

In a further non-limiting embodiment of any of the foregoing gas turbine engine embodiments, the core flow path may be in communication with the combustor section.

In a further non-limiting embodiment of any of the foregoing gas turbine engine embodiments, the high pressure compressor section and said high pressure turbine section may be in communication with the core flow path.

In a further non-limiting embodiment of any of the foregoing gas turbine engine embodiments, the gas turbine engine may comprise an inlet guide vane upstream of the high pressure compressor section and downstream of the intercooling turbine section, the inlet guide vane within the core flow path.

A gas turbine engine according to another exemplary aspect of the present disclosure comprises an intercooling turbine section to at least partially drive one of a low spool and a high spool, and an intercooling turbine section bypass to selectively bypass at least a portion of a core flow through an intercooling turbine section bypass path around the intercooling turbine section.

In a further non-limiting embodiment of any of the foregoing gas turbine engine embodiments, the low spool may include a fan section, the fan section includes a bypass fan driven by the low spool through a geared architecture.

In a further non-limiting embodiment of any of the foregoing gas turbine engine embodiments, the high spool may include a high pressure compressor section and a high pressure turbine section, the high pressure compressor section aft of the intercooling turbine section and forward of a combustor section.

A method of operating a gas turbine engine according to an exemplary aspect of the present disclosure includes bypassing at least a portion of a core flow through an intercooling turbine section bypass path around an intercooling turbine section, the intercooling turbine section forward of a high pressure compressor section.

In a further non-limiting embodiment of any of the foregoing methods, the method may further comprise injecting the portion of the core flow through the intercooling turbine section bypass path downstream of an intercooling turbine section rotor.

In a further non-limiting embodiment of any of the foregoing methods, the method may further comprise injecting the portion of the core flow through the intercooling turbine section bypass path upstream of downstream intercooling turbine variable vanes.

In a further non-limiting embodiment of any of the foregoing methods, the method may further comprise radially injecting the portion of the core flow through the intercooling turbine section bypass path into a core flow path.

In a further non-limiting embodiment of any of the foregoing methods, the method may further comprise axially injecting the portion of the core flow through the intercooling turbine section bypass path into a core flow path.

In a further non-limiting embodiment of any of the foregoing methods, the method may further comprise modulating a guide vane of the intercooling turbine section to reduce an intercooling turbine expansion pressure ratio (ICT PR) during a first flight condition and modulating the guide vane of the intercooling turbine section to increase the intercooling turbine expansion pressure ratio (ICT PR) during a second flight condition.

In a further non-limiting embodiment of any of the foregoing methods, the method may further comprise driving the intercooling turbine section with a high spool.

In a further non-limiting embodiment of any of the foregoing methods, the method may further comprise further driving the intercooling turbine section with a low spool.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
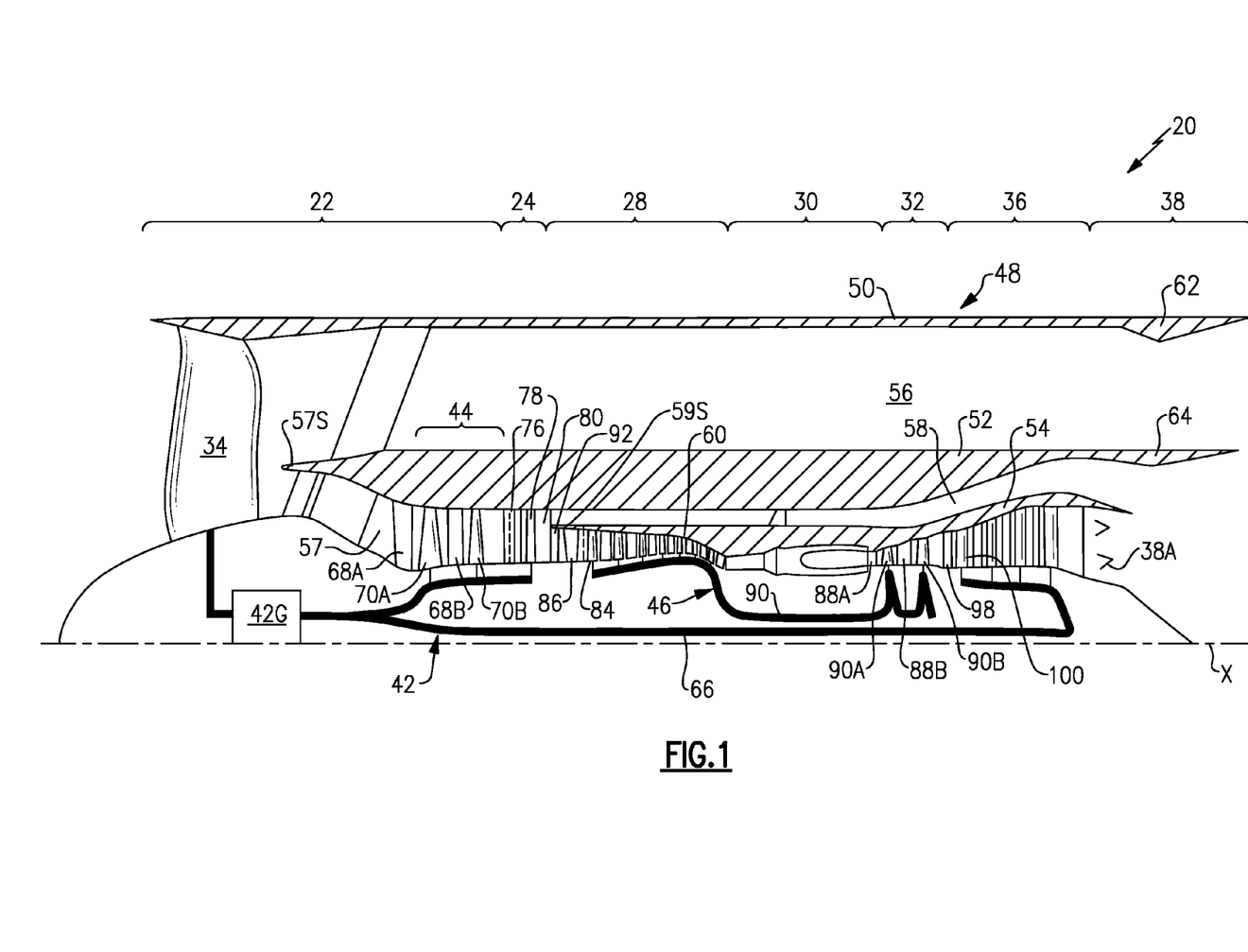
FIG. 1 is a general schematic view of an exemplary variable cycle gas turbine engine according to one non-limiting embodiment.

FIG. 1 schematically illustrates a gas turbine engine 20. The gas turbine engine 20 is disclosed herein as a variable cycle two-spool high bypass turbofan that generally includes a fan section 22, an intercooling turbine section (ICT) 24, a high pressure compressor section (HPC) 28, a combustor section 30, a high pressure turbine section (HPT) 32, a low pressure turbine section (LPT) 36, and a nozzle section 38. Additional sections may include an augmentor section 38A, various duct sections, and a geared architecture 42G among other systems or features. The sections are defined along a central longitudinal engine axis X.

The engine 20 generally includes a low spool 42 and a high spool 46 which rotate about the engine central longitudinal axis X relative to an engine case structure 48. The engine case structure 48 generally includes an outer case structure 50, an intermediate case structure 52 and an inner case structure 54. It should be understood that various structures individually or collectively within the engine may define the case structures 50, 52, 54 to essentially define an exoskeleton that supports the spools 42, 46 for rotation therein.

The fan section 22 generally includes a bypass fan 34 and a low pressure compressor (LPC) 44. The low spool 42 drives the bypass fan 34 directly or through a geared architecture 42G to drive the bypass fan 34 at a lower speed than the low spool 42. The bypass fan 34 communicates fan flow into a bypass flow path 56, a second stream bypass flow path 58, and a core flow path 60.

The low pressure compressor 44 in the disclosed non-limiting embodiment includes two stages downstream of the bypass fan 34. It should be appreciated that various fan stages, as well as a low pressure compressor section, may alternatively or additionally be provided. The low pressure compressor 44 is within an intermediate flow path 57 upstream of a split 59S between the second stream bypass flow path 58 and the core flow path 60 but downstream of a split 57S between the bypass flow path 56 and the intermediate flow path 57 such that all airflow from the low pressure compressor 44 is expanded through the ICT 24. The ICT 24 facilitates the expansion of the airflow to a lower temperature than at the exit of the low pressure compressor 44 and therefore the inlet temperature to the HPC 28 is reduced.

The ICT 24 communicates fan flow into the second stream bypass flow path 58 and the core flow path 60. The ICT 24 is downstream of the low pressure compressor 44 such that all flow from the ICT 24 is selectively communicated into the second stream bypass flow path 58 and the core flow path 60. That is, the ICT 24 is upstream of the split 59S between the second stream bypass flow path 58 and the core flow path 60 but downstream of the split 57S between the bypass flow path 56 and the intermediate flow path 57.

The HPC 28, the combustor section 30, the HPT 32, and the LPT 36 are in the core flow path 60. These sections are referred to herein as the engine core. The core airflow is compressed by the fan section 22, expanded limitedly by the ICT 24, compressed monotonically by the HPC 28, mixed and burned with fuel in the combustor section 30, then expanded over the HPT 32 and the LPT 36. The turbines 32, 36 rotationally drive respectively the high spool 46 and low spool 42 in response to the expansion. The limited expansion of the core flow by the ICT 24 rotationally drives the low spool 42 as a supplement to the LPT 36.

The second stream bypass flowpath 58 permits the match of the ICT 24 exit flow to the flow demand into the HPC 28. That is, the ICT 24 expands fan section 22 flow to reduce inlet temperatures to the HPC 28.

The bypass flow path 56 is generally defined by the outer case structure 50 and the intermediate case structure 52. The second stream bypass flowpath 58 is generally defined by the intermediate case structure 52 and the inner case structure 54. The core flow path 60 is generally defined by the inner case structure 54. The second stream bypass flow path 58 is defined radially inward of the bypass flow path 56 and the core flow path 60 is radially inward of the bypass flowpath 58.

The nozzle section 38 may include a bypass flow exhaust nozzle 62 (illustrated schematically) which receives flow from bypass flow path 56 and a mixed flow exhaust nozzle 64 which receives a mixed flow from the second stream bypass flowpath 58 and the core flow path 60. It should be understood that various fixed, variable, convergent/divergent, two-dimensional and three-dimensional nozzle systems may be utilized herewith.

The low pressure compressor 44, the ICT 24, and the LPT 36 are coupled by a low shaft 66 (illustrated schematically) which is also coupled to the bypass fan 34 directly or through the geared architecture 42G. In the disclosed non-limiting embodiment, the low pressure compressor 44 includes a first stage guide vane 68A, a first stage fan rotor 70A, a second stage guide vane 68B and a second stage fan rotor 70B. It should be appreciated that various systems may be utilized to activate the variable inlet guide vanes and variable stators. It should also be understood that other single or multistage architectures may alternatively or additionally be provided such as various combinations of a fixed or variable vanes.

The HPC 28 and the HPT 32 are coupled by a high shaft 90 (illustrated schematically) to define the high spool 46. In the disclosed non-limiting embodiment, the HPC 28 upstream of the combustor section 30 includes a multiple of stages each with a rotor 84 and vane 86. It should be understood that the HPC 28 may alternatively or additionally include other compressor section architectures which, for example, include additional or fewer stages each with or without various combinations of variable or fixed guide vanes. It should also be understood that each of the turbine sections 32, 36 may alternatively or additionally include other turbine architectures which, for example, include additional or fewer stages each with or without various combinations of variable or fixed guide vanes.

The HPT 32 in the disclosed non-limiting embodiment, includes a multiple of stages (two shown) with first stage variable high pressure turbine guide vanes 88A, a first stage high pressure turbine rotor 90A, second stage variable high pressure turbine guide vanes 88B and a second stage high pressure turbine rotor 90B. It is desirable to have variable turbine vanes both in the ICT 24 and the HPT 32 to facilitate an optimum cycle efficiency; however, significant improvement to the thermodynamic cycle is achieved by the presence of the ICT 24 alone even if the HPT 32 is not variable.

The LPT 36 in the disclosed non-limiting embodiment, includes a multiple of stages (four shown), each stage with variable low pressure turbine inlet guide vanes 98 upstream of a respective low pressure turbine rotor 100. It is desirable to have variable turbine vanes both in the ICT 24 and the LPT 36 to facilitate an optimum cycle efficiency; however, significant improvement to the thermodynamic cycle is achieved by the presence of the ICT 24 alone even if the LPT 36 is not variable. The LPT 36 is the last turbine section within the core flow path 60 and thereby communicates with the mixed flow exhaust nozzle 64 which receives a mixed flow from the second stream bypass flow path 58 and the core flow path 60. The augmentor section 38A among other systems or features may be located downstream of the LPT 36.

The ICT 24 is coupled to the low shaft 66 and is driven with the low spool 42. In the disclosed non-limiting embodiment, the ICT 24 includes upstream intercooling turbine variable vanes 76, an intercooling turbine rotor 78 and downstream intercooling turbine variable vanes 80. The downstream intercooling turbine variable vanes 80 are immediately upstream of the split 59S between the second stream bypass flow path 58 and the core flow path 60. It should be appreciated that the intercooling turbine rotor 78 is a cold turbine located forward of the combustor section 30 but includes turbine blades similar in shape to the turbine blades within the HPT 32 and the LPT 36.

In the disclosed non-limiting embodiment, inlet guide vanes (IGVs) 92 immediately downstream of the intercooling turbine variable vanes 80 are within the core flow path 60 downstream of the split 59S. At cruise, the IGVs 92 are closed, and at takeoff, the IGVs 92 are opened. These IGV settings are similar in function to the downstream intercooling turbine variable vanes 80 such that the downstream intercooling turbine variable vanes 80 may be eliminated in one alternative non-limiting embodiment to simplify the engine architecture.

The high spool 46 is independent of the low spool 42. The HPC 28, the combustor section 30 and the HPT 32 set the core flow and the HPT 32 is the choke point that the HPC 28 feeds. The speed and power output of the HPT 32 determines the flow pumping rate and the pressure rise of the HPC 28 for a given combustor exit temperature that affects the status of the choke point.

The HPC 28 demands a certain inlet flow based on combustor exit temperature. There is a balance between the pressure at the exit of the HPC 28 and the temperature at the choke point. Higher combustor section exit temperature enables higher pressure at the exit of the HPC 28 and a simultaneous solution of continuity (flowrate) and power from the HPT 32.

The low pressure compressor (LPC) 44 communicates the flow required by the HPC 28 but this may result in a flow that stalls the LPC 44. The flow which exits the ICT 24 is thereby split between the HPC 28 and the second stream bypass flowpath 58 around the HPC 28 to facilitate the ability of the low pressure compressor 44 to provide a matched flow to the HPC 28 that is not a stalled condition. That is, the flow which exits the ICT 24 is selectively split into the second stream bypass flowpath 58 to provide a matched flow into the HPC 28.

Opening the upstream intercooling turbine variable vanes 76 and closing the downstream intercooling turbine variable vanes 80 for cruise reduces the intercooling turbine section pressure ratio (ICT PR) and hence reduces the intercooling effect, e.g., the inlet temperature to the HPC 28 will not be significantly decreased. Closing the upstream intercooling turbine variable vanes 76 and opening the downstream intercooling turbine variable vanes 80 for takeoff will increase ICT PR and hence increase the intercooling effect, e.g., the inlet temperature to the HPC 28 will be more significantly decreased. In the disclosed non-limiting embodiment, the intercooling turbine variable vanes 76, 80 are modulated between a 5%-25% closed position. That is, the intercooling turbine variable vanes 76, 80 are never completely closed.

Figure 3:
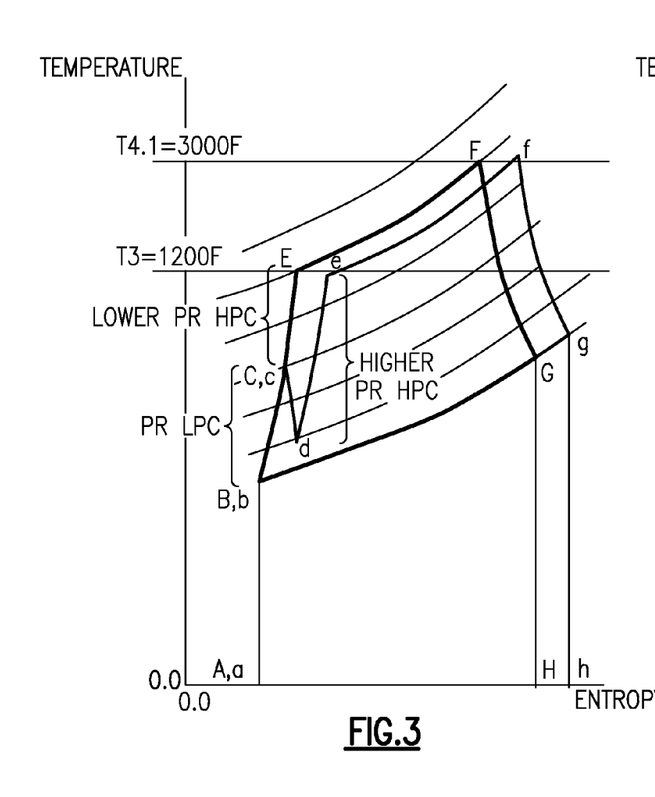
FIG. 3 is a temperature-versus-entropy diagram for a high/hot day take off condition.

Generally, the intercooling turbine variable vanes 80 are opened for takeoff to increase the pressure ratio and intercooling effect to reduce combustor inlet temperature (T3) on hot day conditions (FIG. 3). The intercooling turbine variable vanes 80 are closed for cruise to reduce the intercooling turbine expansion pressure ratio (ICT PR) and the intercooling effect (FIG. 4).

The second stream bypass flowpath 58 permits the match of the ICT 24 exit flow to the flow demand into the HPC 28. That is, the ICT 24 expands fan section 22 flow to reduce inlet temperatures to the HPC 28.

Figure 2:
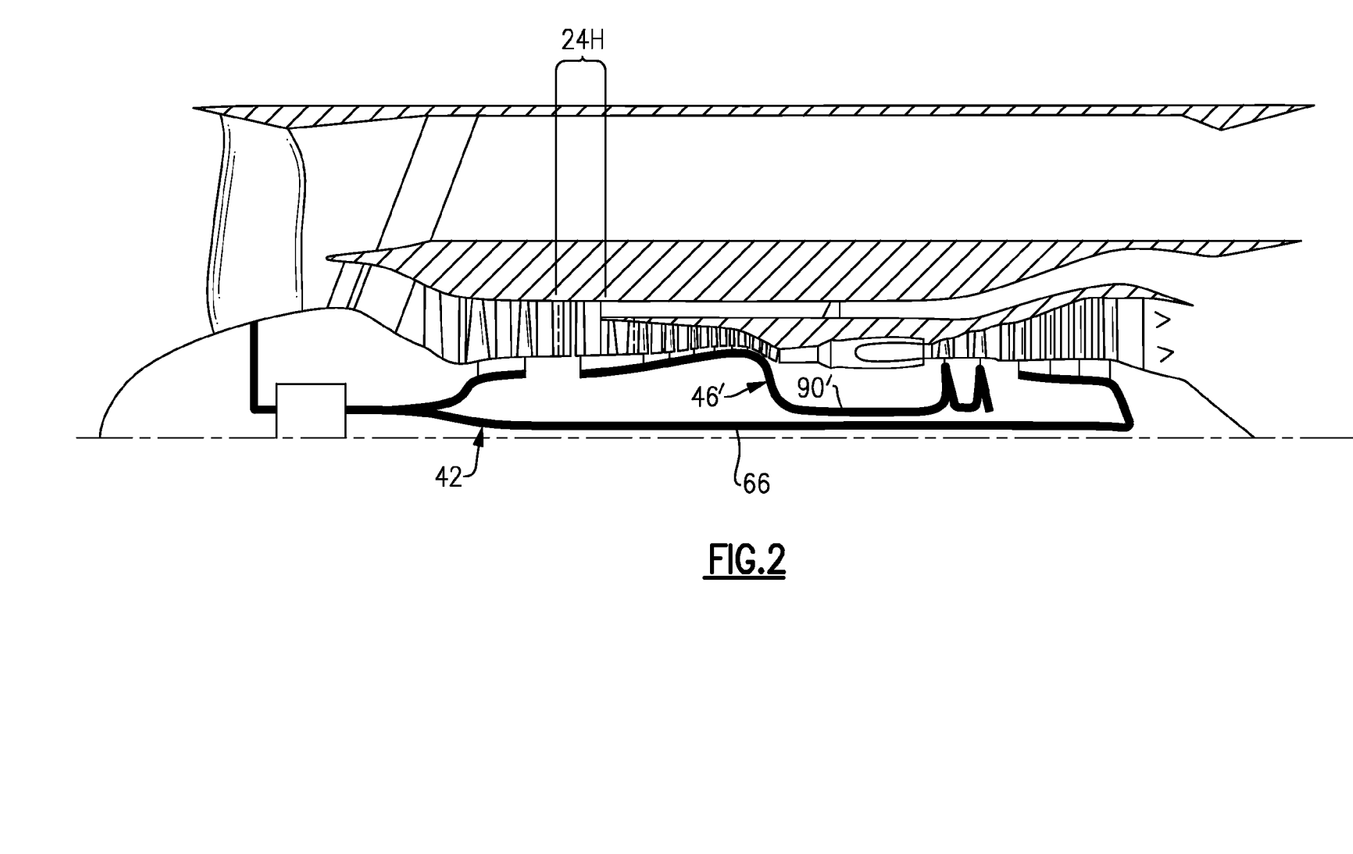
FIG. 2 is a general schematic view of an exemplary variable cycle gas turbine engine according to another non-limiting embodiment.

With reference to FIG. 2, in another disclosed, non-limiting embodiment, the ICT 24H is coupled to the high shaft 90' and is driven with the high spool 46'. When the ICT 24H is on the high spool 46', the ICT 24H operates relatively faster and the amount of turning in the turbine is relatively smaller as compared to the when the ICT 24 is on the low spool 42 (FIG. 1). The ICT 24H on the high spool 46 is more efficient thermodynamically but relatively less efficient aerodynamically. There is thereby some tradeoffs involved, but otherwise the architecture and operation is generally equivalent.

Figure 4:
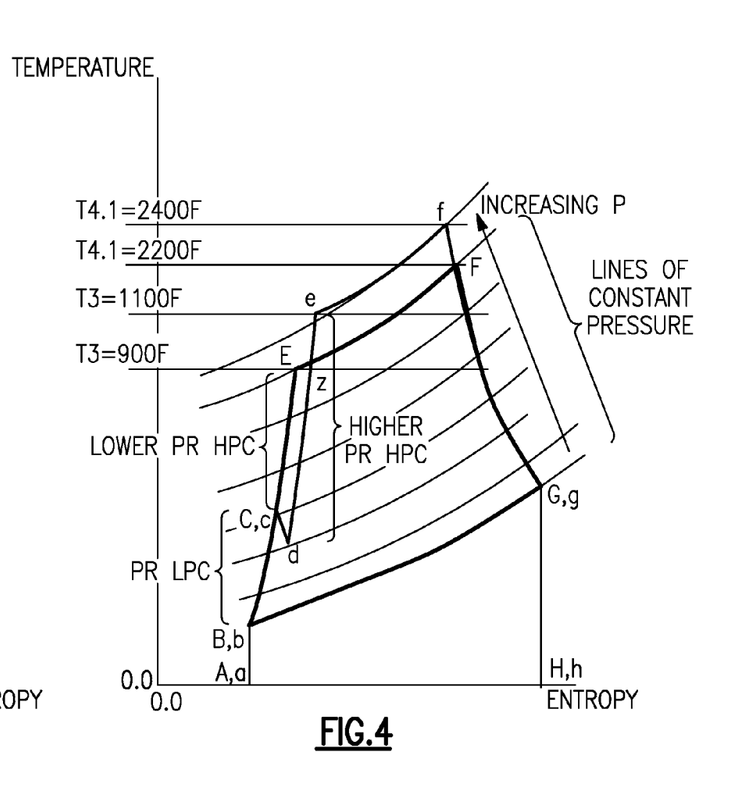
FIG. 4 is a temperature-versus-entropy diagram for a cruise condition.

With reference to FIGS. 3 and 4, a conventional engine cycle is defined thermodynamically on a Temperature-Entropy diagram by the points A, B, C, E, F, G, H. The priority for improvement of the thermodynamic efficiency of the engine is to increase the area enclosed by the points B, C, E, F, G, but especially doing so by "raising the roof" of points (E) and (F) that correspond respectively to an increase in the overall PR of the engine compression system (E) and an increase in the inlet temperature to the HPT 32 (F).

The inventive engine cycle disclosed herein is defined thermodynamically on the Temperature-Entropy diagram by points a, b, c, d, e, f, g, h. The priority is improvement of the cruise condition efficiency where significant fuel is consumed.

Both the conventional engine and the inventive engine 20 architectures disclosed herein operate at the hot day takeoff condition (FIG. 3) with the same inlet temperature and pressure to the engine, the same inlet temperature and pressure to the low pressure compressor 44: TB=Tb; and PB=Pb, as well as the same temperature and pressure at the exit of the low pressure compressor 44: TC=Tc; and PC=Pc.

For the inventive engine disclosed herein the inlet temperature and pressure to the HPC 28 are Td and Pd, respectively. The ICT 24 expands the exit flow of the low pressure compressor 44 so that the inlet temperature and pressure to the HPC 28 of the inventive engine are decreased significantly to achieve an intercooling effect on the temperature of compression, that is, Td<TC and Pd<PC.

For both the conventional engine and the inventive engine, the exit condition of the HPC 28 is the inlet condition of the combustor section 30. Both the conventional engine and the inventive engine operate at the hot day takeoff condition with the same combustor inlet temperature (T3), where TE=Te, and with the same HPT 32 first rotor inlet temperature, (T4.1), where TF=Tf. This is consistent with utilization of the same materials and mechanical design technologies for both the conventional and inventive engine.

The pressure ratio (PR) of the HPC 28 of the inventive engine is significantly higher than the PR of the conventional engine, that is, Pe:Pd>PE:PC. The temperature ratio (TR) of the HPC 28 of the inventive engine is significantly higher than the TR of the conventional engine, that is, Te:Td>TE:TC. The higher PR of the HPC 28 of the inventive engine 20 is achievable, for example, with additional compressor section stages.

Neglecting combustor pressure losses, the pressures, PE and PF for the conventional engine are the same. The pressures, Pe and Pf, for the inventive engine are the same, but PE>Pe and PF>Pf; this is attributable to the pressure expansion in the ICT 24.

Both the conventional engine and the inventive engine operate with the same HPT 32 first rotor inlet temperature (T4.1), and TF=Tf at the hot day takeoff condition. At the hot day takeoff condition, both the conventional engine and the inventive engine operate with the same exit pressure from the turbine section so that PG=Pg, but not the same exit temperature from the turbine section, that is, Tg>TG.

The thermodynamic cycle efficiency of an engine generally is proportional to the ratio of two areas on the Temperature-Entropy diagram. That is, the numerator area and the denominator area form this ratio of areas. For the conventional engine, the numerator area is enclosed by the points B, C, E, F, and G, while the denominator area is enclosed by the points H, G, B, and A. For the inventive engine, the numerator area is enclosed by the points b, c, d, e, f, and g, while the denominator area is enclosed by the points h, g, b, and a.

At the hot day takeoff condition, the numerator area of the conventional engine is greater than or equal to the numerator area of the inventive engine, while the denominator area of the conventional engine is less than the denominator area of the inventive engine; thus, the thermodynamic efficiency of the conventional engine is relatively better than the inventive engine at the hot day takeoff condition (FIG. 3).

The priority, however, is to improve the thermodynamic cycle efficiency at the cruise condition where much of the fuel is consumed. Both the conventional engine and the inventive engine operate at the cruise condition with the same inlet temperature and pressure to the engine and the same inlet temperature and pressure to the low pressure compressor 44; TB=Tb and PB=Pb. Note that the inlet temperature and pressure at the cruise condition (FIG. 4) are less than the inlet temperature and pressure at the hot day takeoff condition (FIG. 3).

At the cruise condition, both the conventional and inventive engine have the same temperature and pressure at the exit of the low pressure compressor 44; TC=Tc and PC=Pc. For the inventive engine 20, the inlet temperature and pressure to the HPC 28 are Td and Pd, respectively. At the cruise condition, the ICT 24 expands the exit flow of the low pressure compressor 44 so that the inlet temperature and pressure to the HPC 28 of the inventive engine are not decreased significantly to obtain a smaller intercooling effect on the temperature within the compressor section; regardless, Td<TC and Pd<PC.

The expansion of the ICT 24 is selectively less at the cruise condition and this is obtained by modulation of the variable vanes 76 and 80. At the cruise condition as well as the hot day takeoff condition, the HPC 28 of the inventive engine 20 has a higher PR than the conventional engine and the higher PR is achieved for example, with additional stages of compression in the HPC 28. The pressure ratio (PR) of the HPC 28 of the inventive engine is significantly higher than the PR of the conventional engine, that is, Pe:Pd>PE:PC. The temperature ratio (TR) of the HPC of the inventive engine is significantly higher than the TR of the conventional engine, that is, Te:Td>TE:TC. At the cruise condition, the HPC 28 exit pressure and exit temperature of the inventive engine are higher than the conventional engine, that is, Pe>PE and Te>TE.

For both the conventional engine and the inventive engine, the exit condition of the HPC 28 is the inlet condition of the combustor section 30. Neglecting combustor pressure losses, the pressures, PE and PF for the conventional engine are the same. The pressures, Pe and Pf for the inventive engine are the same, but at the cruise condition, Pe>PE, and Pf>PF; this is attributed to the deliberately smaller expansion of pressure in the ICT 24 and the higher PR of the HPC 28 of the inventive engine.

Application of the same materials and mechanical design technologies to both the conventional and inventive engine is limiting at the hot day takeoff condition but not at the cruise condition provided T3 and T4.1 at the cruise condition are lower than at the hot day takeoff condition.

At the cruise condition, HPT 32 first rotor inlet temperature (T4.1) of the inventive engine is greater than T4.1 of the conventional engine; that is, Tf>TF at the cruise condition. At the cruise condition, both the conventional engine and the inventive engine operate with the same exit pressure of the turbine section so that PG=Pg, and the same exit temperature from the turbine section, TG=Tg.

With reference to FIG. 4, at the cruise condition, the numerator area of the inventive engine is greater than the numerator area of the conventional engine, while the denominator areas of the conventional engine and the inventive engine are the same; thus, the thermodynamic efficiency of the inventive engine is greater than the conventional engine at the cruise condition. The larger numerator area of the inventive engine is evident by comparison between the two sectional areas of the Temperature-Entropy diagram at the cruise condition.

The first sectional area is enclosed by the points z, e, f, and F, while the second sectional area is enclosed by the points C, E, z, and d. The first sectional area yields an increase in the numerator area of the inventive engine. The first sectional area is greater than the second sectional area to yield a net increase in the numerator area of the inventive engine disclosed herein versus the numerator area of the conventional engine.

The ICT 24 effectively "raises the roof" of the thermodynamic cycle of the engine at the cruise condition with the same materials and mechanical design constraints as a conventional engine architecture at the hot day takeoff condition.

Figure 5:
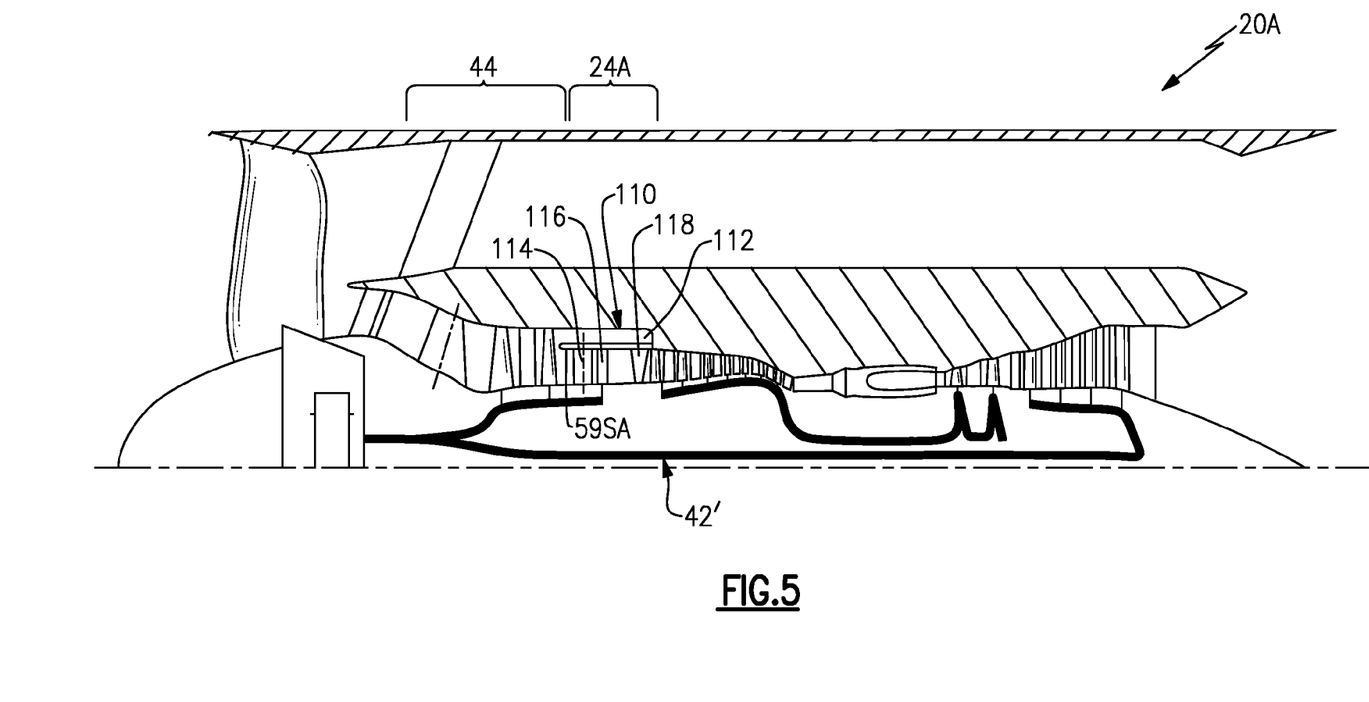
FIG. 5 is a schematic view of an exemplary variable cycle gas turbine engine according to another non-limiting embodiment.
Figure 6:
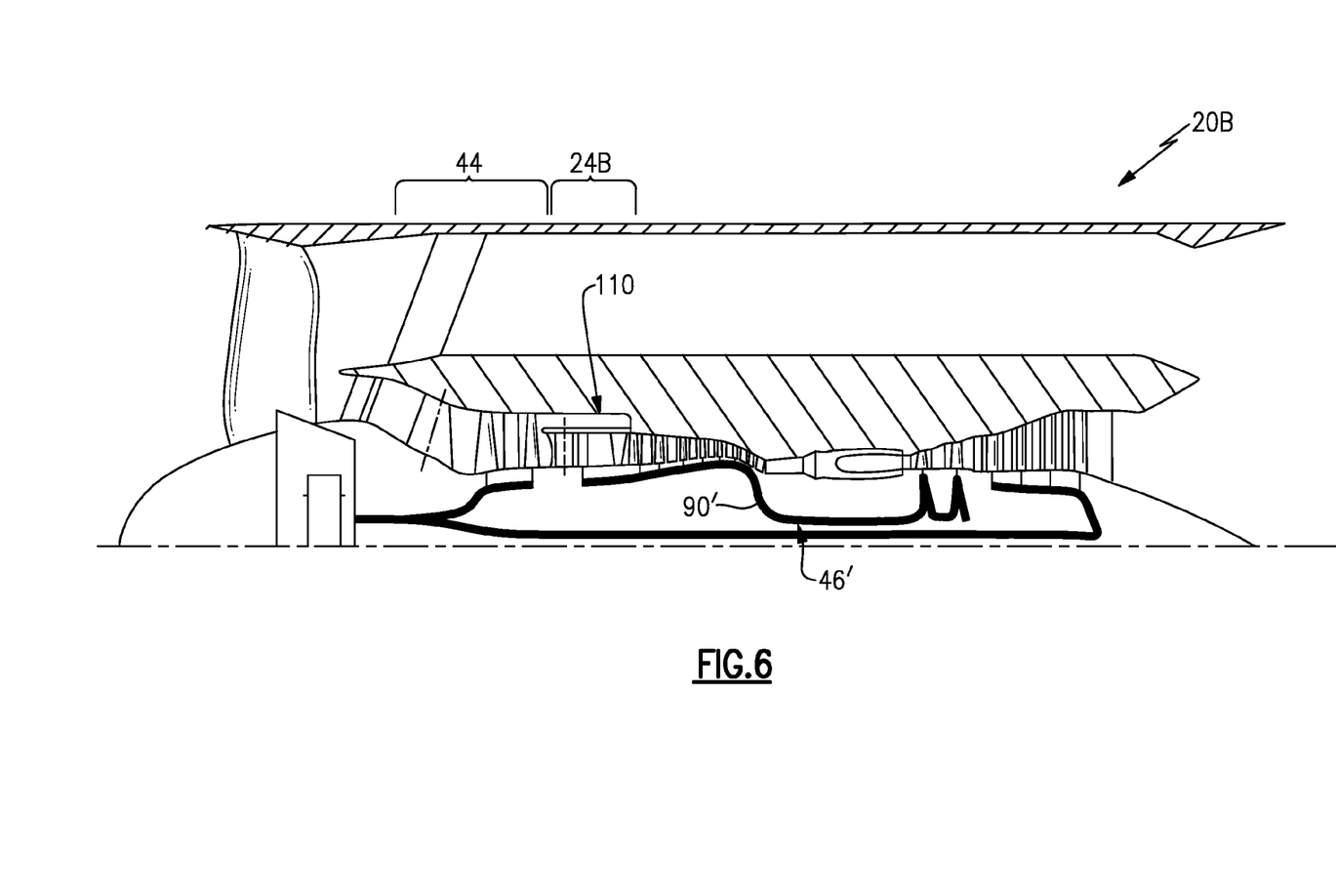
FIG. 6 is a general schematic view of an exemplary variable cycle gas turbine engine according to another non-limiting embodiment.
Figure 7:
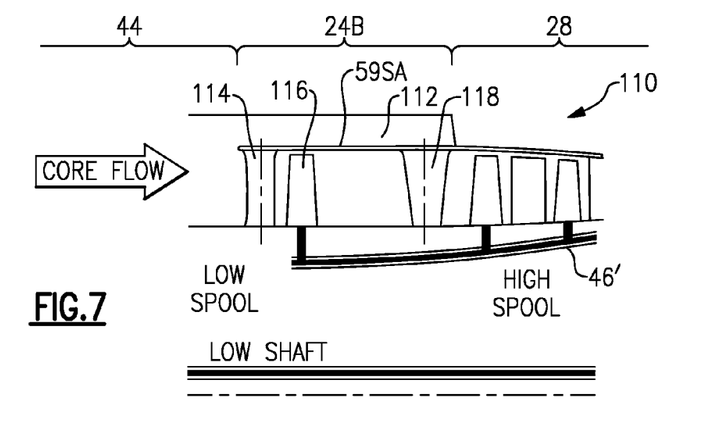
FIG. 7 is an expanded view of the ICT of FIG. 6.

With reference to FIG. 5, another non-limiting embodiment of an exemplary variable cycle gas turbine engine 20A includes an ICT 24A with an ICT bypass 110. Although the ICT 24A is illustrated as being driven by the low spool 42', an ICT 24B may alternatively be coupled to the high shaft 90' of the high spool 46' (FIG. 6). That is, the ICT 24B is coupled to drive the high spool 46' (FIG. 7) or the ICT 24A is coupled to drive the low spool 42' (FIG. 8).

A relatively axially short ICT bypass flow path 112 generally replaces the second stream bypass flow path 58 (FIGS. 1 and 2) and may only extend approximately the axial length of the ICT 24A to bypass the ICT 24A. The ICT 24A generally includes upstream ICT variable vanes 114, an ICT rotor 116 and downstream ICT variable vanes 118.

Figure 8:
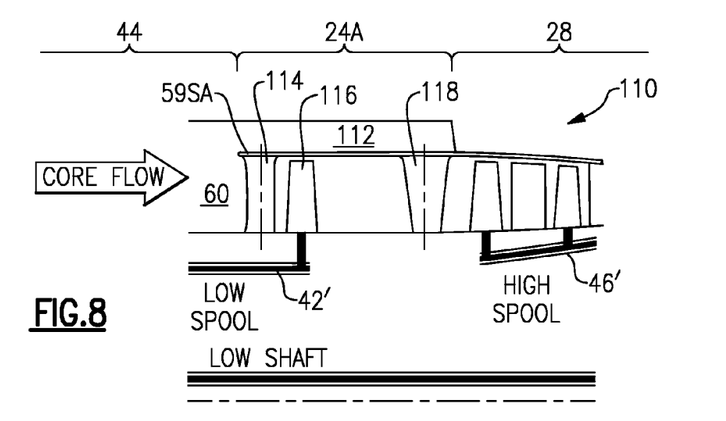
FIG. 8 is an expanded view of the ICT of FIG. 5.

With reference to FIG. 8, the core flow which exits the LPC 44 is partitioned into two streams by a splitter 59SA between the radially inner core flow path 60 and the radially outer ICT bypass flow path 112. The inner stream enters the ICT 24A and the flow is regulated by the upstream ICT variable vanes 114 and the downstream ICT variable vanes 118. The outer stream enters the ICT bypass flow path 112 to bypass the upstream ICT variable vanes 114, the ICT rotor 116 and the downstream ICT variable vanes 118 so that the outer flow stream through the ICT bypass flow path 112 is not turboexpanded and thereby does not provide an intercooling effect.

Figure 9:
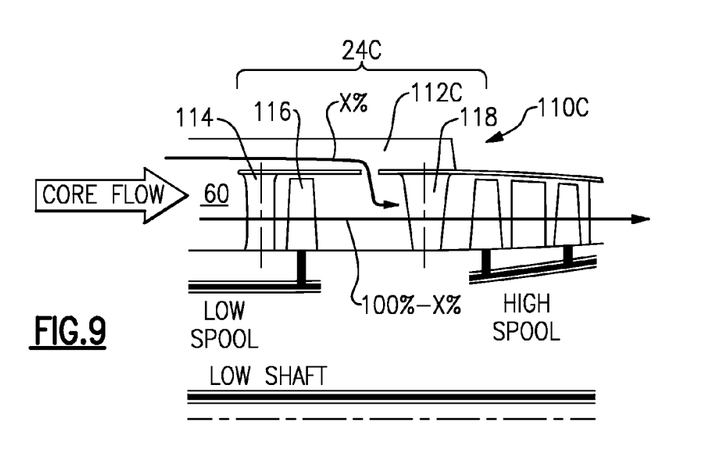
FIG. 9 is an expanded view of the ICT according to one non-limiting embodiment.

With reference to FIG. 9, a fraction (x %) of the flow which exits the LPC 44 is bypassed through the ICT bypass flow path 112 then mixed with the remainder flow (100%–x %) that exits the LPC 44 and is expanded through the ICT 24C. In this disclosed, non-limiting embodiment, the ICT bypass 110C includes an ICT bypass flow path 112C that communicates with the core flow path 60 downstream of the ICT rotor 116 but upstream of the downstream ICT variable vanes 118. That is, the ICT bypass flow is discharged generally radially inward into the core flow path 60.

Figure 10A:
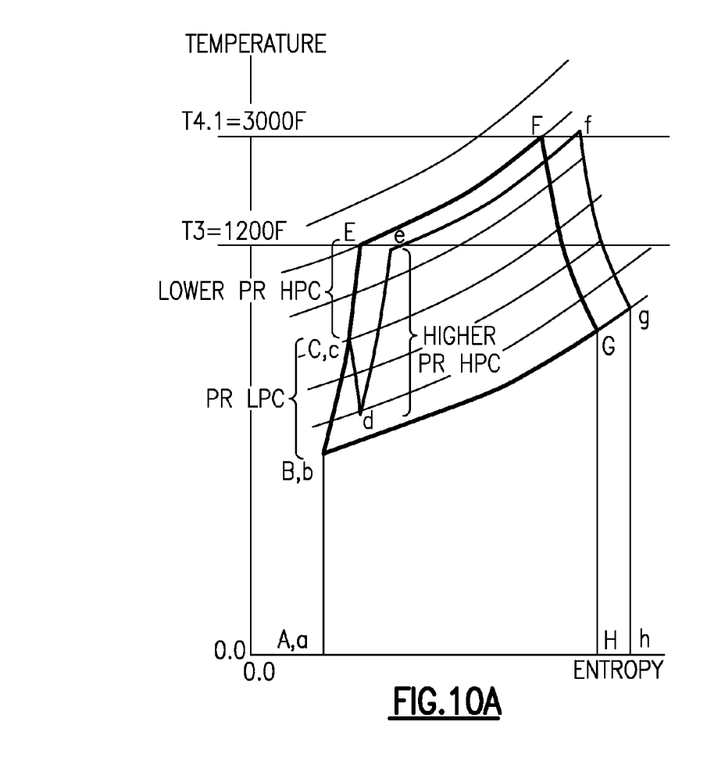
FIGS. 10A-10C are temperature-versus-entropy diagrams for a high/hot day take off condition.
Figure 10B:
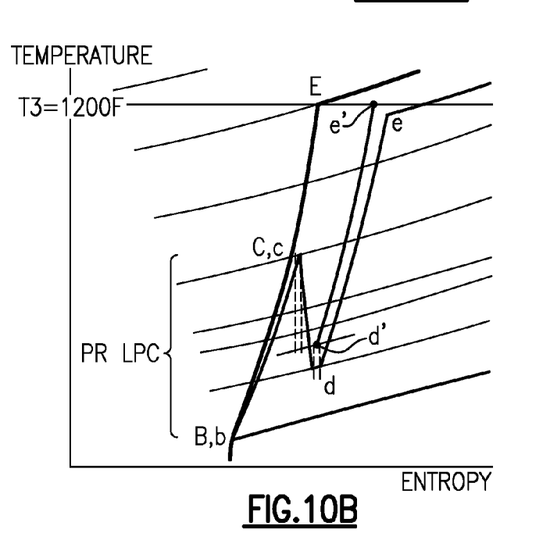
Figure 10C:
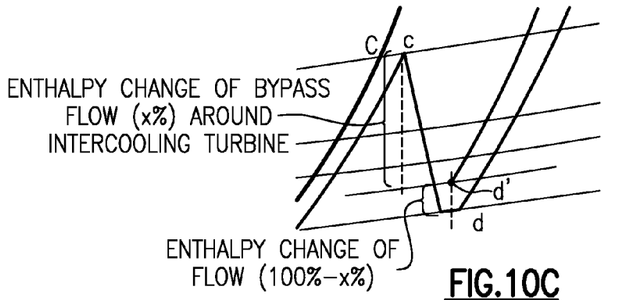

With reference to FIGS. 10A-10C, the mixed flow has thermodynamic state d-prime (d') that is higher in temperature and pressure than state (d). The state (d') of the flow entering the HPC is thermodynamically more efficient than state (d) and state (d') initiates a thermodynamically increased HPC compression process that finishes at state (e'). The result is a larger area in the numerator, i.e., Area: b, c, d', e', f, g is greater than Area: b, c, d, e, f, g; and the thermodynamic cycle is more efficient. Note that the temperatures at points E, e', and e are the same, but PE>Pe'>Pe.

Figure 11A:
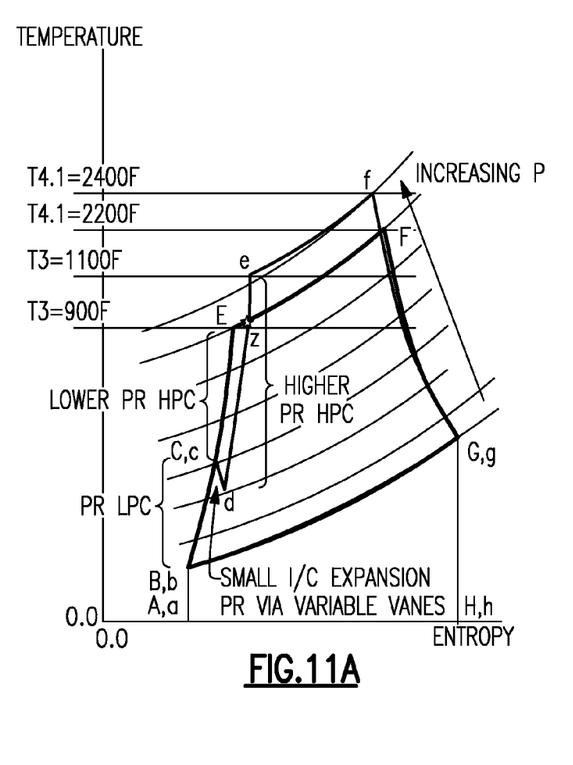
FIGS. 11A-11B are temperature-versus-entropy diagrams for a cruise condition.
Figure 11B:
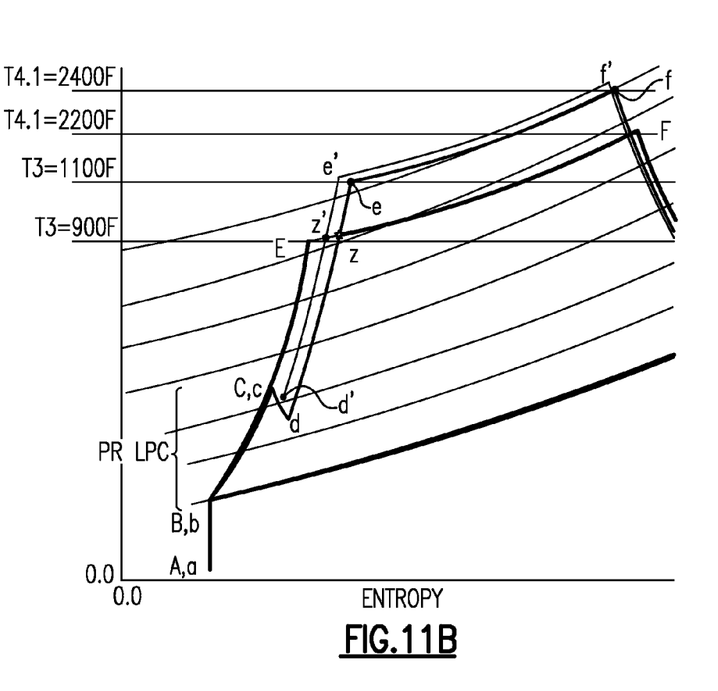

With reference to FIGS. 11A and 11B, the same general process is executed at the cruise condition but the expansion PR of the ICT 24A is less due to closing of the downstream ICT variable vanes 118 and opening of the upstream variable vanes 114. The mixed flow has thermodynamic state d-prime (d') that is higher in temperature and pressure than state (d). The state (d') of the flow entering the HPC is thermodynamically more efficient than state (d) and state (d') initiates a thermodynamically better HPC compression process that finishes at state (e'). The result is a larger area in the numerator, i.e., Area: b, c, d', e', f, g is greater than Area: b, c, d, e, f, g; and the thermodynamic cycle is even more efficient than the conventional engine cycle (B, C, E, F, G). Note that the temperatures at points e' and e are the same, but Pe'>Pe and Pf'>Pf.

The temperature Tf' is slightly higher than the temperature Tf but the cycle improvement is achieved even if the temperature Tf'=Tf. The section area z', e', f', F, is larger than the section area z, e, f, F; this further increases the numerator area of the inventive cycle. The section area C, E, z', d', is smaller than the section area C, E, z, d; this also increases the numerator area of the inventive cycle. The ICT bypass 110 mixing further improves the thermodynamic cycle efficiency relative to usage of an intercooled turbine alone. Present cycle work studies show an approximate 2% TSFC improvement at cruise.

Figure 12:
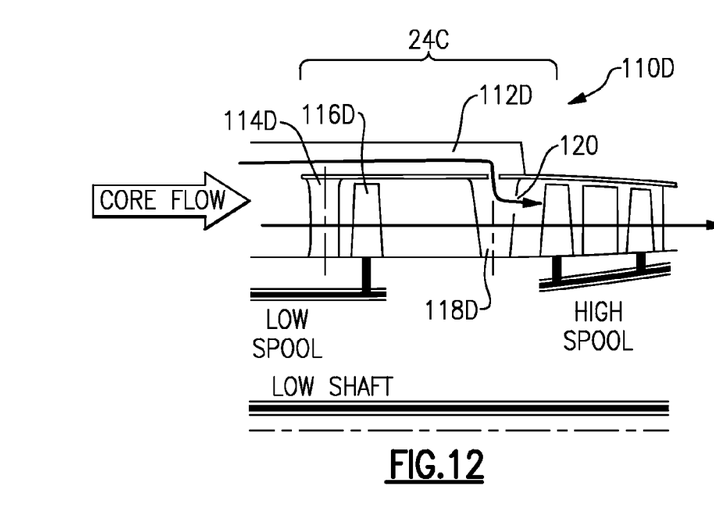
FIG. 12 is an expanded view of the ICT according to another non-limiting embodiment.
Figure 13:
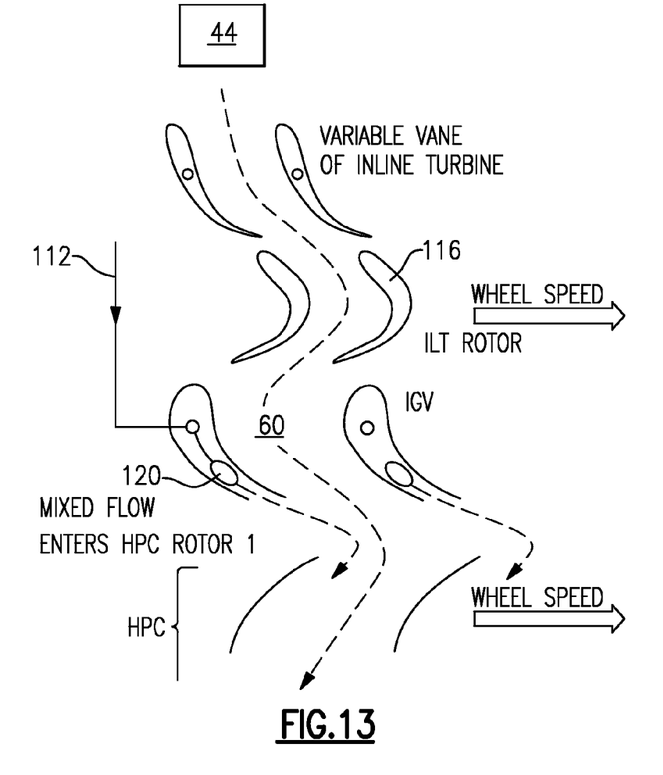
FIG. 13 is a schematic radial view of the ICT of FIG. 12.

With reference to FIG. 12, in another disclosed, non-limiting embodiment, the ICT bypass 110D includes downstream ICT variable vanes 118D that communicate ICT bypass flow into the core flow path 60 through exits 120 such as trailing edge slots (FIG. 13). That is, the downstream ICT variable vanes 118D discharge the ICT bypass flow axially into the core flow path 60. The stream discharges in a generally axial direction vis-à-vis the downstream ICT variable vanes 118D. It should be appreciated that various intakes and exits may alternatively or additionally be utilized.

Since the downstream ICT variable vanes 118D are variable, the mixing process is benefited; i.e. the downstream ICT variable vanes 118D operates as a defacto variable area mixer that is readily optimized between the velocities of the core flow that was turboexpanded through the ICT 24D and the flow from the exits 120. Nominally, 75% of the flow exiting the LPC passes through the ITC rotor 116 and 25% bypasses the ITC rotor 116. Relative to the total flow exiting the LPC, there nominally is 10% of the flow that mixes via exits 120.

Figure 14:
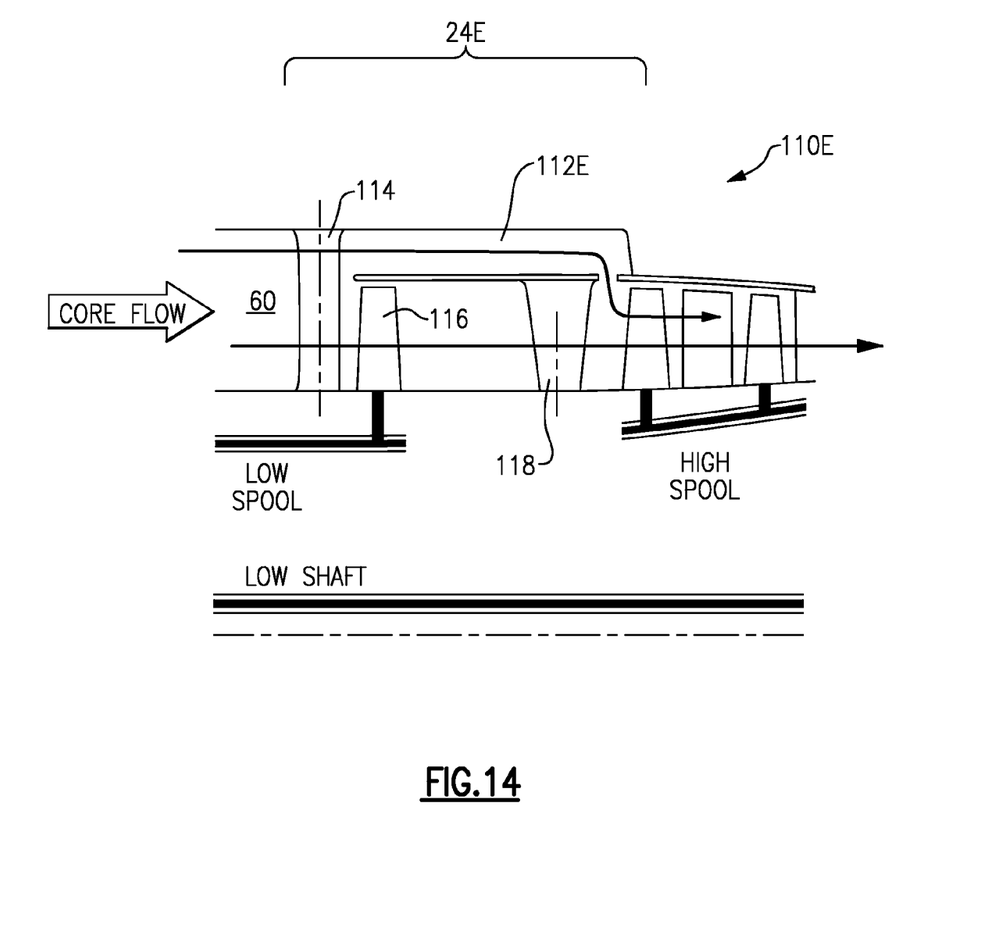
FIG. 14 is an expanded view of the ICT according to another non-limiting embodiment.

With reference to FIG. 14, in another disclosed, non-limiting embodiment, the ICT bypass 110E includes an ICT bypass flow path 112E that communicates with the core flow path 60 downstream of the downstream ICT variable vanes 118. That is, the ICT bypass flow is discharged generally radially inward into the core flow path 60. The mixed flow, downstream of the ICT variable vanes 118 is an axial flow post mixing. Nominally, 75% of the flow exiting the LPC passes through the ITC rotor 116 and 25% bypasses the ITC rotor 116.

Figure 15:
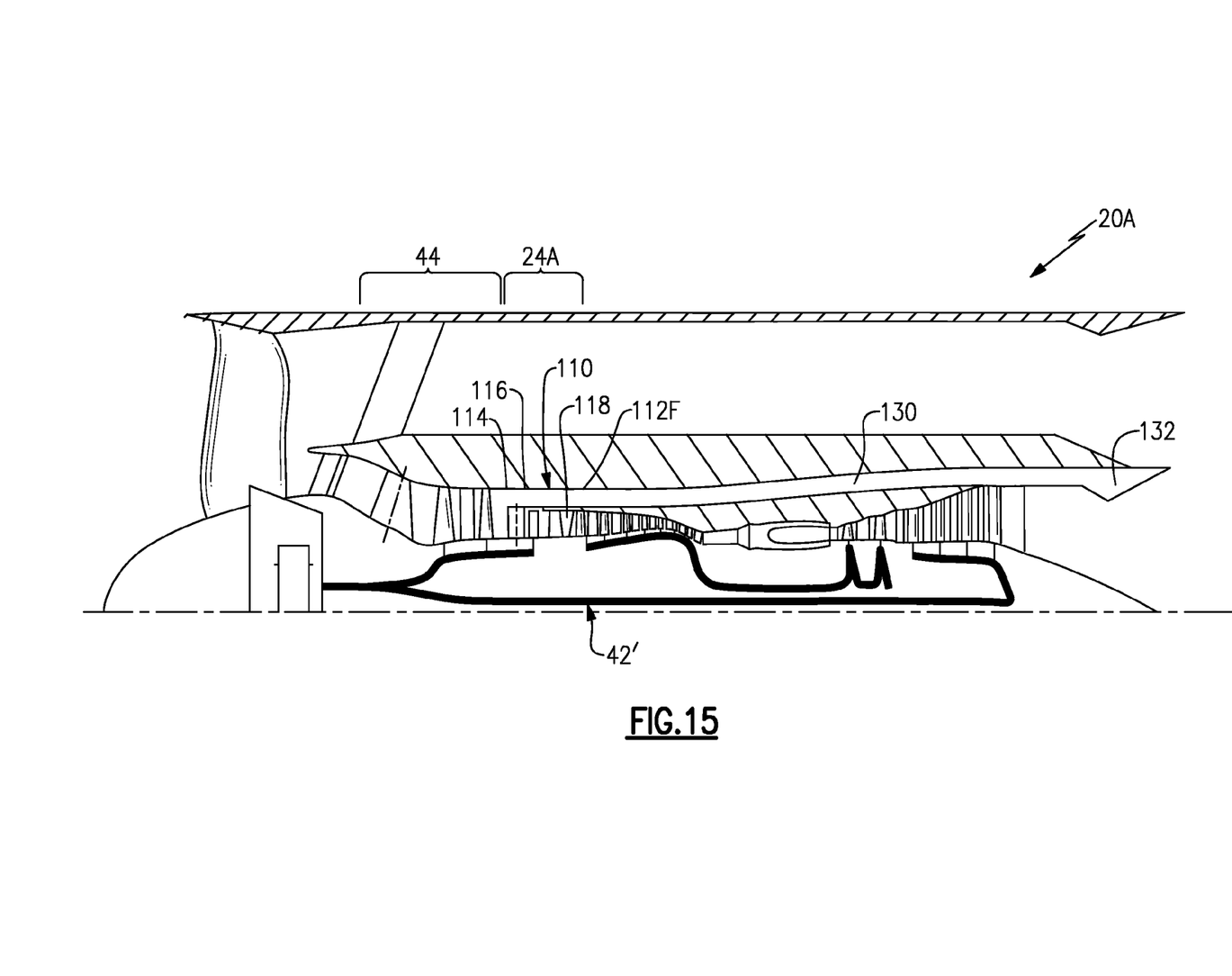
FIG. 15 is an expanded view of the ICT according to another non-limiting embodiment with a third stream flow.

With reference to FIG. 15, in another disclosed, non-limiting embodiment, an ICT bypass flow path 112F may extend beyond the ICT 24A to bypass a fraction of the ICT bypass flow around the HPC to provide a third stream 130. The third stream may be communicated aft to a third stream nozzle section 132. The ICT bypass flow path 112F may be utilized in combination with any of the disclosed non-limiting embodiments described above.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be understood that relative positional terms such as "forward," "aft," "upper," "lower," "above," "below," and the like are with reference to the engine but should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A gas turbine engine comprising:
   a combustor section;
   a low spool along an engine axis with a fan section including a low pressure compressor section;
   a high spool along said engine axis with a high pressure compressor section and a high pressure turbine section, said high pressure compressor section forward of said combustor section to receive a core flow along a core flow path;
   an intercooling turbine section rotatable about said engine axis and situated in flow communication with, and situated axially between, said low pressure compressor section and said high pressure compressor section; and
   an intercooling turbine section bypass to selectively bypass at least a portion of said core flow through an intercooling turbine section bypass path around said intercooling turbine section.

2. The gas turbine engine as recited in claim 1, wherein said intercooling turbine section is rotationally coupled to drive said high spool.

3. The gas turbine engine as recited in claim 1, wherein said core flow path is in communication with said combustor section.

4. The gas turbine engine as recited in claim 3, wherein said high pressure compressor section and said high pressure turbine section are in communication with said core flow path.

5. The gas turbine engine as recited in claim 1, further comprising an inlet guide vane upstream of said high pressure compressor section and downstream of said intercooling turbine section, said inlet guide vane within said core flow path.

6. The gas turbine engine as recited in claim 1, wherein said intercooling turbine section includes an intercooling turbine section inlet receiving flow from a low pressure compressor section outlet of said low pressure compressor section, and said intercooling turbine section includes an intercooling turbine section exit discharging flow to a high pressure compressor section inlet of said high pressure compressor section.

7. The gas turbine engine as recited in claim 6, wherein said intercooling turbine section includes upstream ICT variable vanes, downstream ICT variable vanes and an ICT rotor axially there between.

8. The gas turbine engine as recited in claim 1, wherein said intercooling turbine section is in a flow path that extends around said engine axis, with a split at an exit of said flow path downstream of said intercooling turbine section, said split dividing said flow path into said intercooling turbine section bypass path and said core flow path.

9. The gas turbine engine as recited in claim 8, wherein said intercooling turbine section bypass path is radially intermediate of said core flow path and a bypass flow path from said fan section.

10. A gas turbine engine comprising:
    a combustor section;
    a low spool along an engine axis with a fan section;
    a high spool along said engine axis with a high pressure compressor section and a high pressure turbine section, said high pressure compressor section forward of said combustor section to receive a core flow along a core flow path;
    an intercooling turbine section forward of said combustor section; and
    an intercooling turbine section bypass to selectively bypass at least a portion of said core flow through an intercooling turbine section bypass path around said intercooling turbine section, wherein said intercooling turbine section is rotationally coupled to drive said low spool.

11. A gas turbine engine comprising:
    a combustor section;
    a low spool along an engine axis with a fan section;
    a high spool along said engine axis with a high pressure compressor section and a high pressure turbine section, said high pressure compressor section forward of said combustor section to receive a core flow along a core flow path;
    an intercooling turbine section forward of said combustor section; and
    an intercooling turbine section bypass to selectively bypass at least a portion of said core flow through an intercooling turbine section bypass path around said intercooling turbine section, wherein said intercooling turbine section includes upstream ICT variable vanes, downstream ICT variable vanes and an ICT rotor axially therebetween.

12. The gas turbine engine as recited in claim 11, wherein said upstream intercooling turbine vanes include an inlet in communication with said core path.

13. The gas turbine engine as recited in claim 12, wherein said downstream intercooling turbine variable vanes includes an exit in communication with said core path.

14. The gas turbine engine as recited in claim 11, wherein said upstream intercooling turbine vanes are downstream of a split between said core flow path and said intercooling turbine section bypass.

15. The gas turbine engine as recited in claim 11, further comprising:
    a low pressure turbine (LPT) comprising LPT blades; and
    a high pressure turbine (HPT) comprising HPT blades,
    wherein the shape of at least one of the upstream ICT blades and the downstream ICT blades are similar to the shape of at least one of the LPT blades and the HPT blades.

16. A gas turbine engine comprising:
    a flow path extending around a central axis and having an exit;
    an intercooling turbine section in said flow path and rotationally coupled to at least partially drive one of a low spool and a high spool; and
    a split at said exit downstream of said intercooling turbine section, said split dividing said flow path into a core flow path and an intercooling turbine section bypass to selectively bypass at least a portion of a core flow through an intercooling turbine section bypass path around said intercooling turbine section.

17. The gas turbine engine as recited in claim 16, wherein said low spool includes a fan section, said fan section includes a bypass fan driven by said low spool through a geared architecture.

18. The gas turbine engine as recited in claim 16, wherein said high spool includes a high pressure compressor section and a high pressure turbine section, said high pressure compressor section is aft of said intercooling turbine section and forward of a combustor section.

19. A method of operating a gas turbine engine comprising:
bypassing at least a portion of a core flow through an intercooling turbine section bypass path around an intercooling turbine section, the intercooling turbine section rotatable about an engine axis and situated in flow communication with, and situated axially between, a low pressure compressor section and a high pressure compressor section.

20. The method as recited in claim 19, further comprising:
injecting the portion of the core flow through the intercooling turbine section bypass path downstream of an intercooling turbine section rotor.

21. The method as recited in claim 19, further comprising:
axially injecting the portion of the core flow through the intercooling turbine section bypass path into a core flow path.

22. The method as recited in claim 19, further comprising driving the high spool with the intercooling turbine section.

23. A method of operating a gas turbine engine comprising:
bypassing at least a portion of a core flow through an intercooling turbine section bypass path around an intercooling turbine section, the intercooling turbine section forward of a high pressure compressor section; and
injecting the portion of the core flow through the intercooling turbine section bypass path upstream of downstream intercooling turbine variable vanes.

24. A method of operating a gas turbine engine comprising:
bypassing at least a portion of a core flow through an intercooling turbine section bypass path around an intercooling turbine section, the intercooling turbine section forward of a high pressure compressor section; and
radially injecting the portion of the core flow through the intercooling turbine section bypass path into a core flow path.

25. A method of operating a gas turbine engine comprising:
bypassing at least a portion of a core flow through an intercooling turbine section bypass path around an intercooling turbine section, the intercooling turbine section forward of a high pressure compressor section; and
modulating a guide vane of the intercooling turbine section to reduce an intercooling turbine expansion pressure ratio (ICT PR) during a first flight condition; and
modulating the guide vane of the intercooling turbine section to increase the intercooling turbine expansion pressure ratio (ICT PR) during a second flight condition.

26. A method of operating a gas turbine engine comprising:
bypassing at least a portion of a core flow through an intercooling turbine section bypass path around an intercooling turbine section, the intercooling turbine section forward of a high pressure compressor section; and
driving the low spool with the intercooling turbine section.

* * * * *